US012717671B2

(12) United States Patent
Gomes

(10) Patent No.: US 12,717,671 B2
(45) Date of Patent: Aug. 25, 2026

(54) VALIDATING OS STORAGE BASED ON STORAGE ACCESS EXCEPTION INDICATOR

(71) Applicant: International Business Machines Corporation, Armonk, NY (US)

(72) Inventor: Louis P. Gomes, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 18/966,289

(22) Filed: Dec. 3, 2024

(65) Prior Publication Data

US 2026/0154143 A1 Jun. 4, 2026

(51) Int. Cl.
*G06F 11/07* (2006.01)

(52) U.S. Cl.
CPC ...... *G06F 11/0772* (2013.01); *G06F 11/0793* (2013.01)

(58) Field of Classification Search
CPC ............. G06F 11/0772; G06F 11/0793; G06F 9/3861; G06F 938/65; G06F 11/0721; G06F 11/073
See application file for complete search history.

(56) References Cited

U.S. PATENT DOCUMENTS 5,721,857 A * 2/1998 Glew .................... G06F 9/3834 712/23
5,948,060 A 9/1999 Gregg et al.
9,680,653 B1 6/2017 Bradbury et al.
10,348,506 B2 7/2019 Greiner et al.
10,348,867 B1 * 7/2019 Gemignani, Jr. ............................ G06F 16/90339

(Continued)

FOREIGN PATENT DOCUMENTS

WO WO-2017153815 A1 * 9/2017 ............... G06F 8/47

OTHER PUBLICATIONS

"Semaphore in Java" GeeksforGeeks, GeeksforGeeks, Mar. 11, 2024, www.geeksforgeeks.org/java/semaphore-in-java/. (Year: 2024).*

(Continued)

*Primary Examiner* — Ashish Thomas
*Assistant Examiner* — Catherine Marie Nguyen
(74) *Attorney, Agent, or Firm* — Teddi Maranzano, Esq.; Kevin P. Radigan, Esq.; Heslin Rothenberg Farley & Mesiti P.C.

(57) ABSTRACT

Embodiments herein described techniques for calling an OS service to resolve a storage access exception in OS memory space. To do so, the hardware can use an exception indicator to indicate when an access exception has been detected and then the application program can use the exception indicator to instruct an OS service to resolve the exception on behalf of the application program. In one embodiment, the exception occurs when performing an interruptible instruction issued by the application program where the instruction is performed at different times. When executing the counter update step of the interruptible instruction, the hardware can determine whether an exception is detected, and if so, update an exception indicator. The application program calls the OS service which resolves the access exception in OS memory space on application program's behalf.

20 Claims, 4 Drawing Sheets

(56) References Cited

U.S. PATENT DOCUMENTS

| | | | | |
|---|---|---|---|---|
| 10,817,945 | B2 | 10/2020 | Parsons et al. | |
| 11,449,367 | B2 | 9/2022 | Klein et al. | |
| 2003/0115476 | A1 * | 6/2003 | McKee | G06F 9/52 713/193 |
| 2008/0109593 | A1 * | 5/2008 | Karamcheti | G06F 12/10 711/E12.078 |
| 2009/0210437 | A1 | 8/2009 | Kuila et al. | |
| 2017/0083724 | A1 * | 3/2017 | Chhabra | H04L 9/3242 |
| 2021/0203504 | A1 | 7/2021 | Brandt | |

OTHER PUBLICATIONS

Khan, et al., Designing an HMAC-Hash Unit on FPGAs Using Handel-C, IEEE International Symposium on Industrial Electronics, Jul. 9-13, 2006, vol. 2, pp. 1521-1526.

* cited by examiner

VALIDATING OS STORAGE BASED ON STORAGE ACCESS EXCEPTION INDICATOR

BACKGROUND

The present invention relates to validating a storage access exception using an operating system (OS) service.

Cryptographic algorithms are typically performed using one of two methods. One, the entire input data area is processed by the cryptographic algorithm in a single iteration, storing the final state, and ending with a condition code (CC) with one value (e.g., CC=0) (Normal Completion). Two, the entire input data area is processed by the cryptographic algorithm in multiple iterations where the CC is set to a different value (e.g., CC=3) before finally ending with CC=0 (Normal Completion). That is, the cryptographic algorithm starts at the beginning of the first input data block and processes a subset of the total number of input data blocks, storing the stopping state, and ending with CC=3 (Partial Completion). Picking up from the previous stopping state, the cryptographic algorithm processes a subset of the total number of input data blocks, stores the stopping state, and again ends with CC=3 (Partial Completion). This step may be repeated many times until the last input data block is processed and ending with CC=0 (Normal Completion).

SUMMARY

According to one embodiment of the present invention, a method includes performing, when executing an interruptible instruction issued by an application program, an operating system (OS) storage update where the OS storage update needs to access a data value stored in protected OS memory space, determining that a storage access exception is detected when hardware attempts to access the data value in the OS memory space, updating an exception indicator to indicate a presence of the storage access exception, upon determining the exception indicator indicates the presence of the storage access exception and a condition code corresponding to the interruptible instruction is set to a value indicating the interruptible instruction is not yet complete by the application program, calling an OS service that is part of the OS to resolve the storage access exception, and upon determining the OS service has resolved the storage access exception: updating the data value in the OS memory space and changing the condition code to indicate the interruptible instruction is complete.

According to one embodiment of the present invention, a computing system includes one or more memories and one or more processors communicatively coupled to the one or more memories, the one or more processors configured to, individually or collectively, perform operations. The operations includes performing, when executing an interruptible instruction issued by an application program, an operating system (OS) storage update where the OS storage update needs to access a data value stored in protected OS memory space, determining that a storage access exception is detected when hardware attempts to access the data value in the OS memory space, updating an exception indicator to indicate a presence of the storage access exception, upon determining the exception indicator indicates the presence of the storage access exception and a condition code corresponding to the interruptible instruction is set to a value indicating the interruptible instruction is not yet complete by the application program, calling an OS service that is part of the OS to resolve the storage access exception, and upon determining the OS service has resolved the storage access exception: updating the data value in the OS memory space and changing the condition code to indicate the interruptible instruction is complete.

According to one embodiment of the present invention, a computer program product that includes one or more computer readable storage media and program instructions stored on the one or more computer readable storage media to perform operations. The operations include performing, when executing an interruptible instruction issued by an application program, an operating system (OS) storage update where the OS storage update needs to access a data value stored in protected OS memory space, determining that a storage access exception is detected when hardware attempts to access the data value in the OS memory space, updating an exception indicator to indicate a presence of the storage access exception, upon determining the exception indicator indicates the presence of the storage access exception and a condition code corresponding to the interruptible instruction is set to a value indicating the interruptible instruction is not yet complete by the application program, calling an OS service that is part of the OS to resolve the storage access exception, and upon determining the OS service has resolved the storage access exception: updating the data value in the OS memory space and changing the condition code to indicate the interruptible instruction is complete.

DETAILED DESCRIPTION

Figure 1:
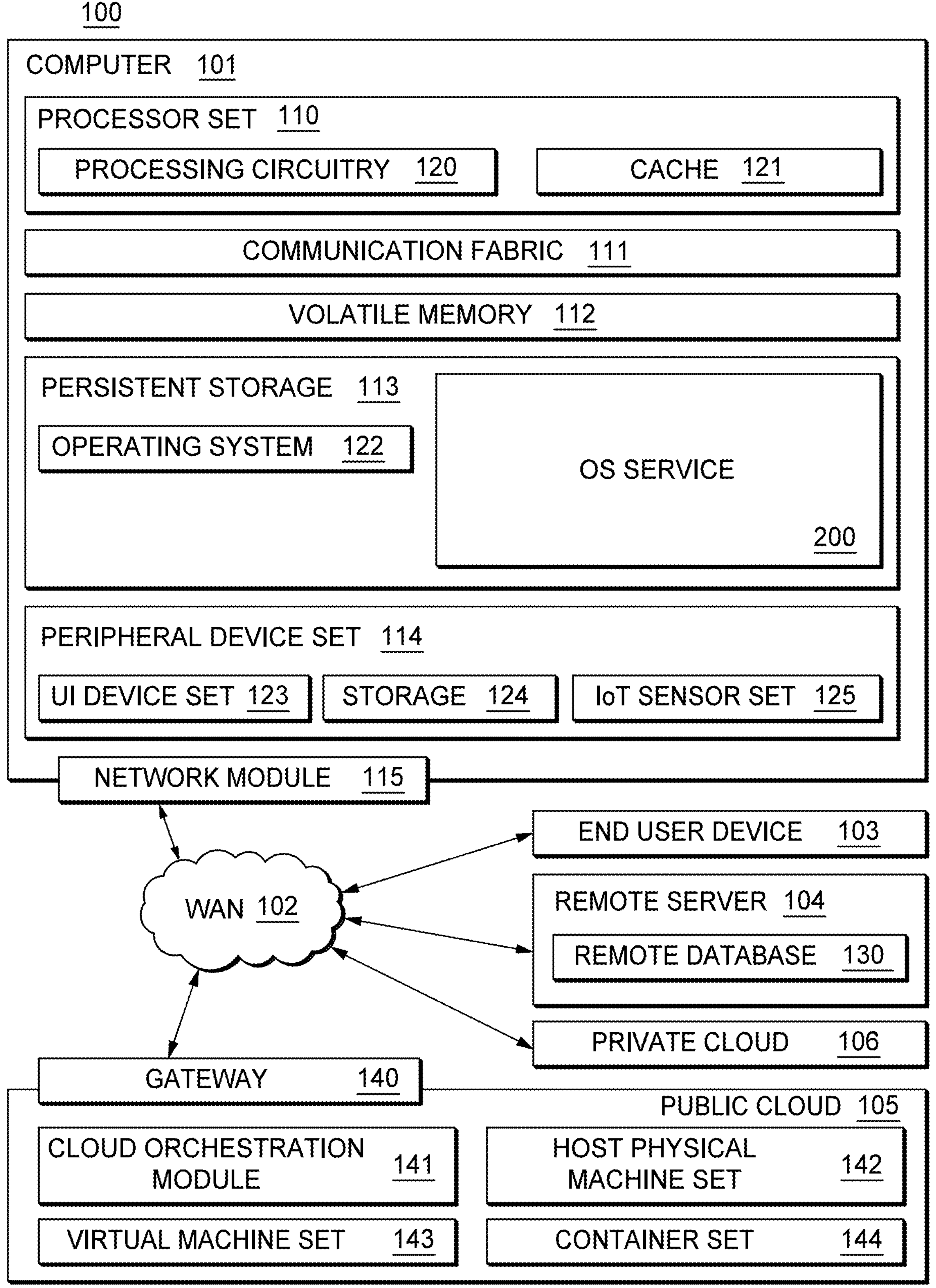
FIG. 1 illustrates computing system, according to one embodiment.

Embodiments herein described techniques for calling an OS service to resolve a storage access exception in OS memory space. This can be performed without receiving a program interrupt from the hardware of the computing system. To do so, the hardware can use an exception indicator to indicate when an access exception has been detected and then an application program (e.g., a user application) can use the exception indicator to instruct an OS service to resolve the exception on behalf of the application program. In one embodiment, the access exception occurs when performing an interruptible instruction issued by the application program where the instruction is performed at different times/iterations, such as described above where a cryptography function processes different blocks of a data stream using different iterations (e.g., to avoid resource starvation so that other concurrently executing applications can use processor cycles). When executing the counter update step of the interruptible instruction (e.g., after processing the block of data immediately preceding the counter update step), the hardware can determine whether a counter storage access exception is detected, and if so, update an exception indicator. Moreover, the hardware can keep the CC in a state that indicates the instruction is not yet complete (even though it has processed all the data). As soon as the application program sees the exception indicator from the hardware, the application program calls the OS service which validates or resolves the access exception. The hardware can then re-check if the exception has been handled, and if so, complete the instruction processing by updating a data structure in the OS memory space and storing the results of the instruction in user memory space.

Some non-limiting technical advantages of the present embodiments include allowing the hardware to save both the function results and present an exception interrupt using an exception indicator (instead of presenting the actual exception interrupt) at the same time which speeds up compute performance in the situations where the hardware architecture does not allow the instruction to save both at the same time. Moreover, the application program can discover and mitigate storage issues earlier (e.g., without re-execution) and bypass lengthy and time-consuming interrupt processing which speeds up compute performance.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as OS service 200 which in include code for resolving storage access exceptions on behalf of an application program. In addition to OS service 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and OS service 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located “off chip.” In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as “the inventive methods”). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in OS service 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in OS service 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

CLOUD COMPUTING SERVICES AND/OR MICROSERVICES (not separately shown in FIG. 1): private and public clouds 106 are programmed and configured to deliver cloud computing services and/or microservices (unless otherwise indicated, the word "microservices" shall be interpreted as inclusive of larger "services" regardless of size). Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of APIs. One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

Figure 2:
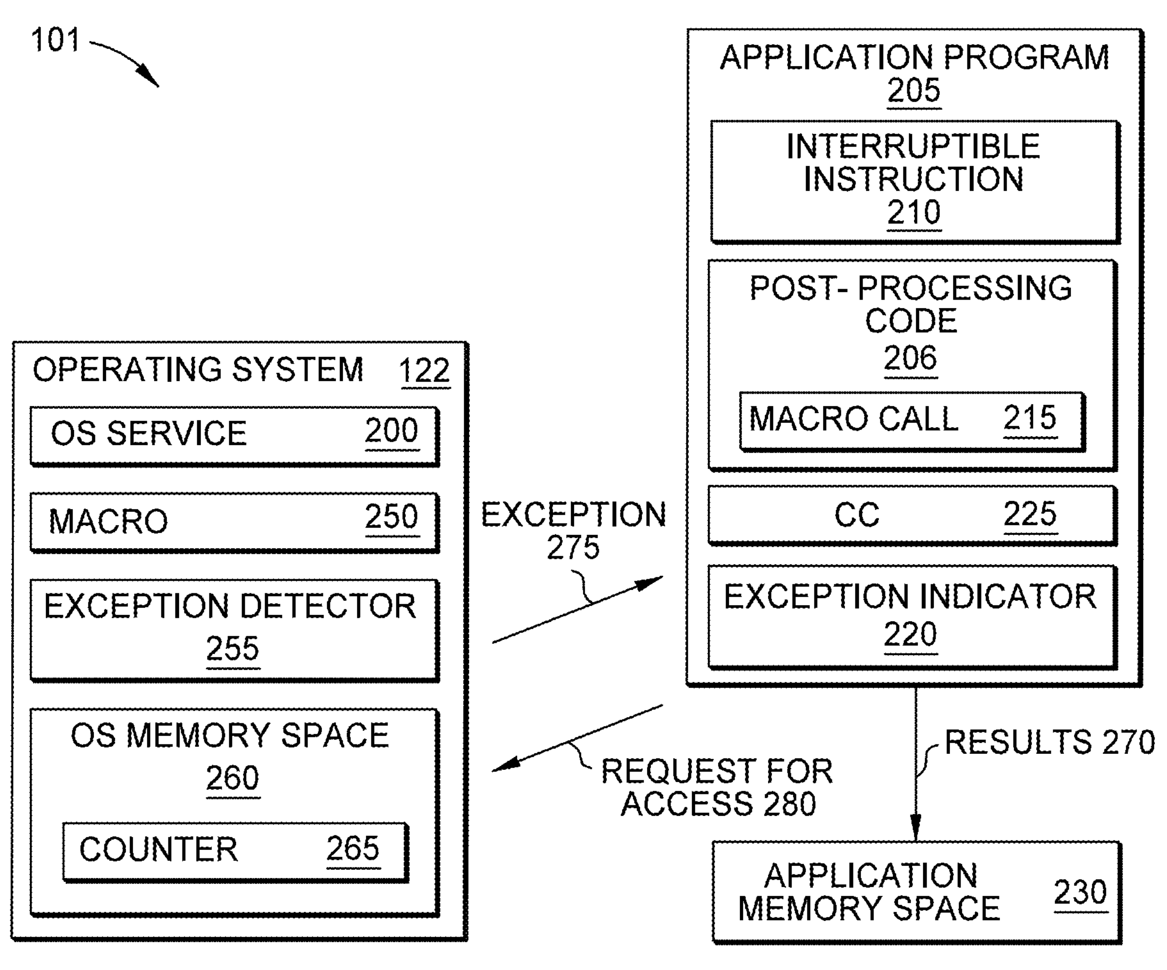
FIG. 2 illustrates a computing system for validating a storage access exception using an OS service, according to one embodiment.

FIG. 2 illustrates a computer 101 (e.g., a computing system) for validating a storage access exception using an OS service 200, according to one embodiment. In this example, the computer 101 includes the operating system 122, an application program 205, OS memory space 260, and application memory space 230. In one embodiment, the application program 205 issues an interruptible instruction 210, which can be performed in a series of interrupted steps. For example, the interruptible instruction 210 may start to execute (e.g., process a first number of data blocks), pause to allow other instructions/applications to use the underlying hardware, and then resume. The state of the interruptible instruction 210 (e.g., a stopping state) can be saved when it is paused (or interrupted). When the instruction 210 is complete, in this example, it has data that it wants to store in both application memory space 230 and OS memory space 260. That is, results 270 may be stored in the application memory space 230 while a counter 265 is updated in the OS memory space 260.

Since the instruction 210 generates outputs that are stored in separate storage (e.g., the application memory space 230 and the OS memory space 260), an exception detector 255 may issue an access exception 275 when the interruptible instruction 210 requests access to the OS memory space 260 as shown by arrow 280. However, the underlying hardware in the computer 101 may not be allowed to store both the results 270 and the access exception 275 at the same time.

Without the embodiments described herein, to resolve the access exception 275 the computer 101 would perform program interrupt processing that is lengthy and time-consuming. As one example, if an exception 275 is detected, hardware may call millicode with the failing instruction address and the interruption code to generate the program interrupt. The millicode finds and stores all the required interrupt code data (generates and stores the program old program status word (PSW), interrupt code, program event recording (PER) data, etc.) and then generates the program interrupt (passes control to OS 122). The OS 122 stores all the program registers very carefully such that the program registers and storage areas are not altered. The OS 122 runs through all the possible program exceptions conditions until it finds a match and then fixes the access exception. The OS 122 loads all the program registers and re-executes the failing instruction—i.e., the interruptible instruction 210. Not only does the delay the application program 205 but it can also lead to erroneous results 270, or force the application program 205 to re-do work it has already done.

To avoid having to perform the program interrupt (which interrupts the application program 205), the embodiments herein establish an OS service 200 in the OS 122 for resolving the access exception 275, which is called using a macro 250. For example, both the OS service 200 and the macro 250 can be placed in respective libraries in the OS 122 which are accessible to programs or applications executing on the computer 101.

In one embodiment, the application program inserts post-processing code 206 immediately following the interruptible instruction 210 before the application program compilation time which includes a macro call 215 which calls the macro 250, which in turn, activates the OS service 200 to resolve the exception 275. This avoids the underlying hardware (e.g., an exception handler circuit) in the computer 101 from having to issue the program interrupt or program abort to handle the exception 275.

Further, to bypass the problem of the hardware being unable to return both the results 270 and the access exception 275, a new exception indicator 220 can be used to indicate to the application program 205 when the exception 275 is detected by the exception detector 255. The exception indicator 220 is generated by the hardware (e.g., hardware exception handler in a central processing unit (CPU)) when it detects the exception 275, and provides the exception indicator 220 to the application program 205 (instead of generating a program interrupt or abort).

When the exception indicator 220 (which can be a flag or a Boolean value) indicates the presence of the exception 275 when attempting to access the OS memory space 260 (and when a CC 225 indicates the interruptible instruction 210 is not complete), the application program 205 (e.g., post-processing code 206) can use the macro call 215 to call the macro 250 and the OS service 200 can resolve or validate the access exception 275 without waiting for the hardware exception handler to detect the same exception condition again on the re-drive of the same instruction by the application program and return the same exception condition using an exception interrupt. This means the program 205 is not interrupted. This process is discussed in more detail in FIGS. 3 and 4.

While FIG. 2 illustrates the interruptible instruction 210 attempting to access (and update) a counter 265 in the OS memory space 260, this is just one non-limiting example. The embodiments herein can be used in any interruptible instruction 210 (or non-interruptible instruction) that has to access both application memory space 230 and protected OS memory space 260 at the same time. For instance, the counter 265 may be a processor-activity instrumentation (PAI) counter. The user may want to ensure their programs are using the most secure algorithms to meet compliance regulations required by various international organizations. The computer 101 can include a PAI facility which provides a single set of counters, called the cryptography-counter set where each counter can be referred to as PAI Counter. There is one PAI Counter for each crypto algorithm function. The cryptography-counter set is controlled by the PAI facility which increments the counters, and the cryptography-counter set storage is controlled by the OS 122. If used to perform cryptography, when the interruptible instruction 210 completes it updates the counter 265 to indicate the type of cryptographic function that was used to process the results 270 being stored in the application memory space 230 so the user can ensure their program 205 is compliant. Non-limiting examples of different types of cryptography techniques that can be reflected in the counter 265 are Compute Message Authentication Code (KMAC)-hash-based message authentication code (HMAC)-secure hashing algorithm (SHA)-224, KMAC-HMAC-SHA-256, KMAC-HMAC-SHA-384, KMAC-HMAC-Encrypted-SHA-224, KMAC-HMAC-Encrypted-SHA-256, KMAC-HMAC-Encrypted-SHA-384, and the like. However, the embodiments herein are not limited to any particular cryptography process, and can apply to interruptible instructions 210 that perform other tasks beside cryptography.

Figure 3:
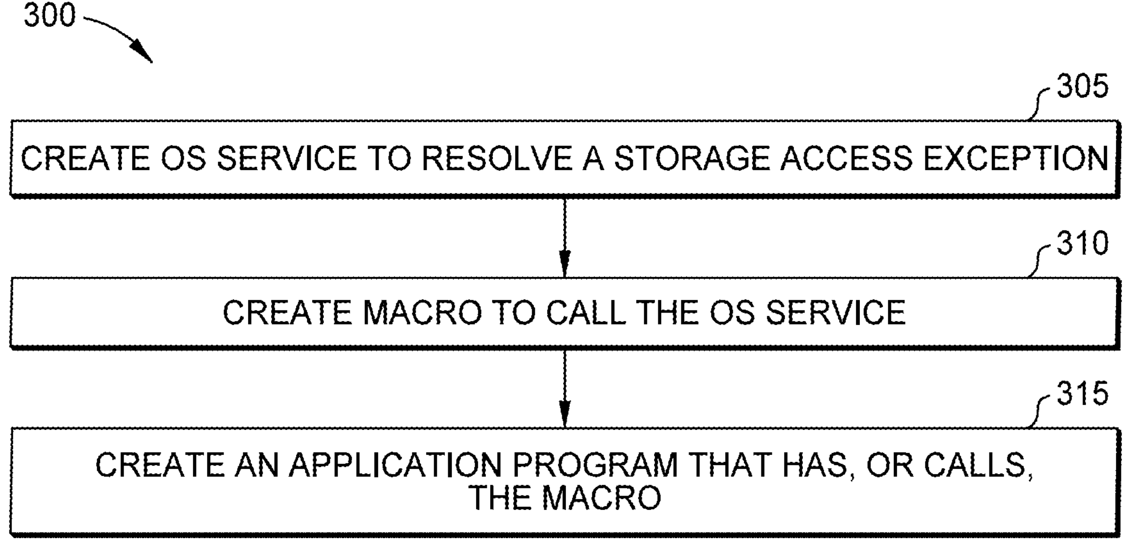
FIG. 3 is a flowchart for creating a computing system for validating a storage access exception, according to one embodiment.

FIG. 3 is a flowchart of a method 300 for creating a computing system for validating a storage access exception, according to one embodiment. At block 305, a programmer creates an OS service (e.g., OS service 200) to resolve a storage access exception (e.g., the access exception 275). In one embodiment, the OS service can be called by any program that wants to resolve a storage access exception in protected OS memory space. Further, the OS service can be part of a service library in the OS.

At block 310, a programmer creates a macro for calling the OS service. In one embodiment, the macro is part of a macro library in the OS. In that case, the application program 205 programmer can use a macro call 215 in the code of the application program 205 to call the macro 250 of the OS service, which in turn calls the OS service 200.

In another embodiment, instead of the macro being part of the OS, the application program programmer can include the macro within the code of the application program 205 which calls the OS service directly.

At block 315, the application program programmer creates the application program 205 which has, or calls, the macro. In one embodiment, the application program inserts post-processing code (e.g., the post-processing code 206 in FIG. 2) immediately following an interruptible instruction before the application program compilation time which includes a macro call which calls the macro of the OS service. As discussed above, the macro can then call the OS service. In one embodiment, the method 300 is performed before the application program is compiled. However, it is also possible to compile the application program with a call to the macro before the macro or the OS service have been added to the OS. In that case, so long as the OS service and the macro are added before the application program 205 executes in the system, the program will function as described herein.

Figure 4:
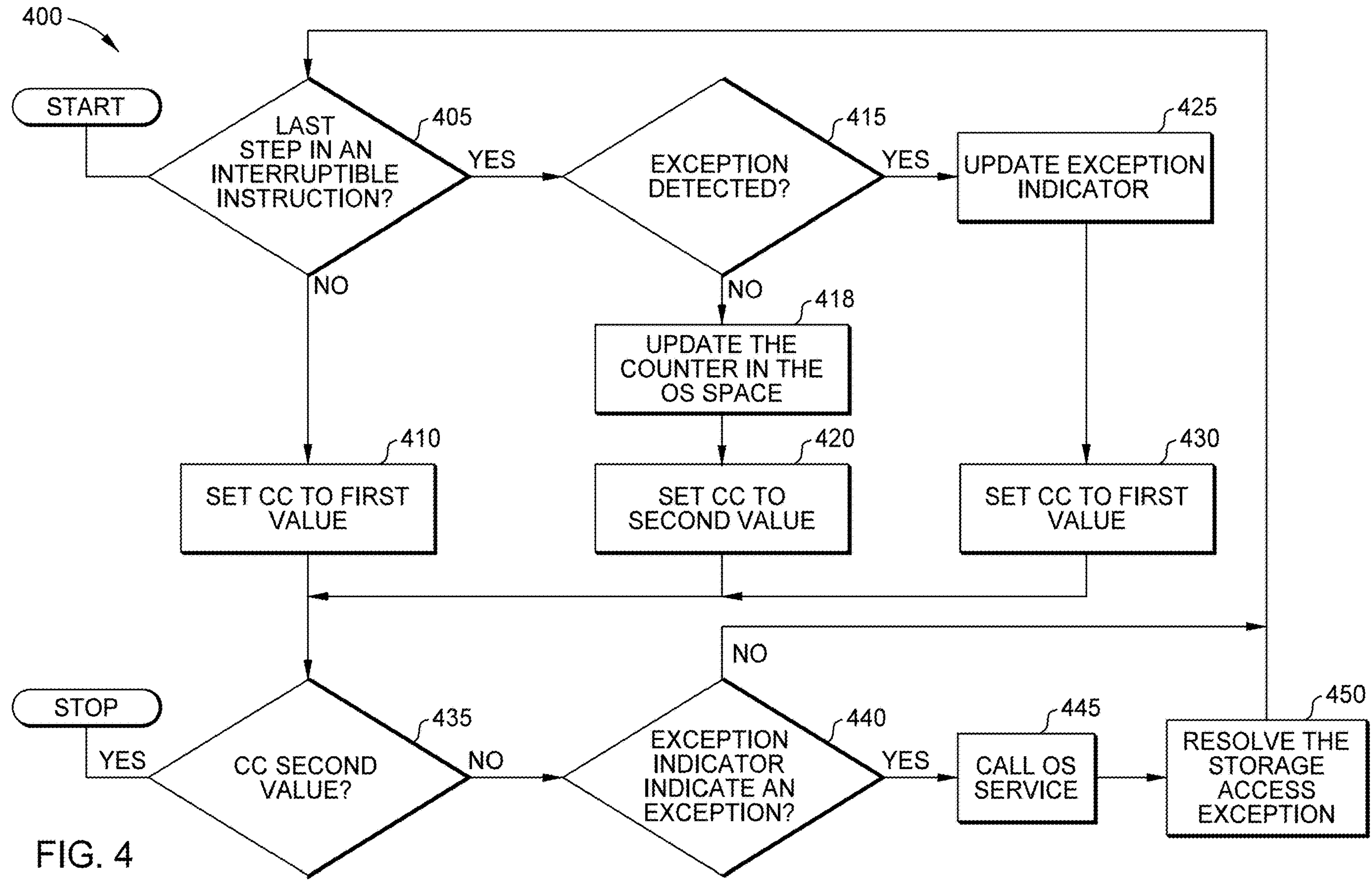
FIG. 4 is a flowchart for validating a storage access exception using an OS service, according to one embodiment.

FIG. 4 is a flowchart of a method 400 for validating a storage access exception using an OS service, according to one embodiment. The method 400 assumes that method 300 has been performed where the OS service, macro, and application program have been established.

Moreover, the method 400 assumes that the application program has an interruptible instruction followed by post-processing code in the application program code. At block 405, the hardware (e.g., the CPU) determines whether it has reached the last step of the interruptible instruction. For example, if the instruction processes a data stream using multiple (interrupted) steps (e.g., perform an operation that is part of a cryptography process), the application program determines whether the instruction is currently processing the last blocks of the data stream.

If not, the method 400 proceeds to block 410 where the hardware sets a condition code (CC) for the instruction 210 to a first value indicating the instruction is not yet complete. The instruction may perform other tasks such as saving a stopping state. As discussed below, if the CC is the first value indicating the instruction is not complete, the method 400 will repeat.

Returning to block 405, if the instruction has reached the last step, the method 400 proceeds to block 415 where the hardware determines whether a storage access exception was detected when requesting access to OS memory space. Advantageously, in one embodiment, the application program waits to check whether the storage access exception is detected at the last step of the interruptible instruction. This can save cycles.

In one embodiment, the request that causes the storage access exception may be a request to access and update a register or value maintained in the protected OS memory space, such as the counter 265 in FIG. 2. The exception detector 255 may receive the request from the application program 205 and the hardware generates the exception 275 if it determines the memory space 260 is not ready for access by the hardware.

If the interruptible instruction is at the last step and the exception is not detected (which means the application program is able to access the protected OS memory space), the method 400 proceeds to block 418 where the hardware updates the counter in the OS space and saves the results of the interruptible instruction (e.g., processed data blocks) in application program memory space in parallel, and then proceeds to block 420 where the hardware sets the CC to a second value indicating that the interruptible instruction execution is complete. In that case, at block 435 the program determines the CC is the second value and the method 400 stops.

However, if at block 415 the hardware determines there is an exception (which has not been resolved), the method 400 instead proceeds to block 425 where the hardware updates the exception indicator to indicate there is a storage access exception, which means the hardware cannot currently access the desired location in the OS memory space for storing the counter. The hardware provides the exception indicator to the application program. That is, the hardware provides an exception indicator instead of presenting the actual exception interrupt which would cause an application program to end.

At block 430, the hardware sets the CC to the first value (or leaves it at that value) to indicate the interruptible instruction is not yet ready to finish or complete.

At block 435, the hardware determines whether the CC is the first or second value. The CC will be the first value if blocks 410 or 430 were performed, and will be the second value if block 420 was performed.

Assuming the CC is the first value, the method proceeds to block 440 where the exception indicator indicates there is an exception. The scenario where the execution indicator indicates there is not an exception is when the interruptible instruction is not on the last step and the CC is the first value. In that case, the method 400 returns to block 405 where another step of the interruptible instruction is performed until eventually it reaches its last step.

However, assuming that the interruptible instruction is at the last step and the exception was detected (and has not yet been resolved), at block 440 the method proceeds to block 445 where the post-processing code of the interruptible instruction in the application program calls the OS service 200. This can include using a macro call in the post-processing code of the application program to the OS service, or performing a macro call to a macro in the OS which in turn calls the OS service.

At block 450, the OS service resolves the storage access exception. In other words, the OS service validates that the memory address(es) associated with the storage access exception can be accessed by the hardware.

After the OS service performs block 450, the application program can continue to execute normally. That is, the application program is not interrupted by a program interrupt or program abort. The method will again return to block 405 (by the post-processing code of the interruptible instruction in the application program) and then block 415, but now, since the OS service has resolved the exception, there will be no exception detected. As such, the method 400 will proceed to block 418 where the hardware updates the counter in the OS space and saves the results of the interruptible instruction (e.g., processed data blocks) in application program memory space in parallel, and then proceeds to block 420 where the CC is set to the second value and then to block 435.

In this manner, the method 400 enables the application program to recognize the existence of a specific storage access exception before it is reported to the OS by the machine using a program interrupt. The application program calls the OS service to resolve the specific storage access exception when a specific storage access exception is encountered by the hardware for the first time. The OS responds to an unsolicited command from the application program (e.g., at block 450) and in turn resolves the specific storage access exception without receiving a program interrupt (or a program abort) from the underlying hardware of the computing system.

The method 400 can be especially advantageous for a pageable guest program because it works with a page of storage at a time by constantly using page-in/page-out to validate/invalidate storage pages.

Figure 5:
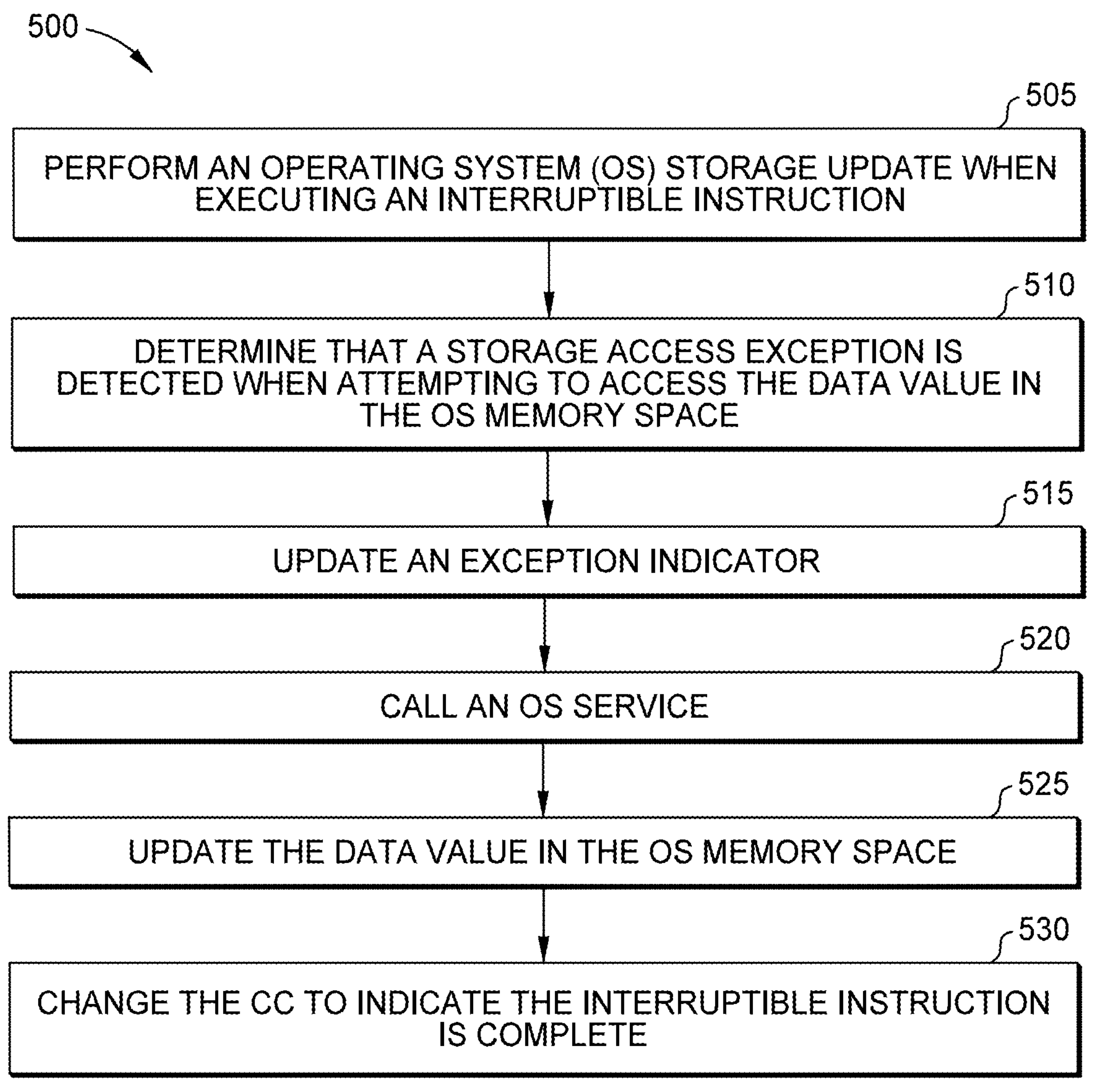
FIG. 5 is a flowchart for creating a computing system for validating a storage access exception, according to one embodiment.

FIG. 5 is a flowchart for a method 500 for creating a computing system for validating a storage access exception, according to one embodiment. At block 505, the hardware is performing an operating system (OS) storage update when executing an interruptible instruction. In this example, the interruptible instruction needs to access a data value stored in protected operating system (OS) memory space before completing, such as the counter 265 in FIG. 2.

At block 510, the hardware determines that a storage access exception is detected when attempting to access the data value in the OS memory space. This can correspond to block 415 of FIG. 4.

At block 515, the hardware updates an exception indicator (which is accessible to the application program) to indicate the presence of the storage access exception. This can correspond to block 425 of FIG. 4.

At block 520, the application program calls an OS service that is part of the OS to resolve the storage access exception. This can correspond to block 445 of FIG. 4. In one embodiment, block 520 is performed upon determining the exception indicator indicates a presence of the storage access exception and a CC corresponding to the interruptible instruction is set to a value indicating the interruptible instruction is not yet complete.

At block 525, the hardware updates the data value in the OS memory space. This can be performed after the storage access exception has been resolved.

At block 530, the hardware changes the CC to indicate the interruptible instruction is complete. This can correspond to block 420 of FIG. 4. In one embodiment, blocks 525 and 530 are performed upon determining the OS service has resolved the storage access exception.

While the foregoing is directed to embodiments of the present invention, other and further embodiments of the invention may be devised without departing from the basic scope thereof, and the scope thereof is determined by the claims that follow.

What is claimed is:

1. A method comprising:

performing, when executing an interruptible instruction issued by an application program, an operating system (OS) storage update, wherein the OS storage update needs to access a data value stored in protected OS memory space, and wherein executing the interruptible instruction comprises a plurality of processing steps of different blocks of data;

determining that a storage access exception is detected when hardware attempts to access the data value in the protected OS memory space;

updating an exception indicator to indicate a presence of the storage access exception;

setting a condition code for respective processing steps of the plurality of processing steps to indicate completion status of the different blocks of data;

upon determining the exception indicator indicates the presence of the storage access exception and the condition code is set to a value indicating the interruptible instruction is not yet complete by the application program, calling an OS service that is part of the OS to resolve the storage access exception; and upon determining the OS service has resolved the storage access exception:

updating the data value in the protected OS memory space, and changing the condition code to indicate the interruptible instruction is complete.

2. The method of claim 1, wherein the OS service resolves the storage access exception without a program interrupt or a program abort being issued by hardware in a computing system executing the application program, the method further comprising:

re-issuing the interruptible instruction to complete remaining function processing.

3. The method of claim 1, further comprising:

generating results from performing the respective processing steps of the plurality of processing steps of the interruptible instruction; and storing the results in application program memory space in parallel with updating the data value in the protected OS memory space.

4. The method of claim 3, wherein the respective processing steps of the interruptible instruction comprises processing multiple blocks of data.

5. The method of claim 4, wherein the data value is a counter that is incremented by hardware, wherein updating the data value comprises storing an updated count into the counter to indicate a type of algorithm used to process the multiple blocks of data.

6. The method of claim 1, wherein calling the OS service that is part of the OS to resolve the storage access exception further comprises:

calling a macro in the OS using a macro call in the application program, wherein the macro calls the OS service.

7. The method of claim 6, wherein the OS service and the macro are in respective libraries in the OS.

8. A computing system, comprising:

one or more memories; and one or more processors communicatively coupled to the one or more memories, the one or more processors configured to, individually or collectively, perform operations comprising:

performing, when executing an interruptible instruction issued by an application program, an operating system (OS) storage update, wherein the OS storage update needs to access a data value stored in protected OS memory space, and wherein executing the interruptible instruction comprises a plurality of processing steps of different blocks of data;

determining that a storage access exception is detected when hardware attempts to access the data value in the protected OS memory space;

updating an exception indicator to indicate a presence of the storage access exception;

setting a condition code for respective processing steps of the plurality of processing steps to indicate completion status of the different blocks of data;

upon determining the exception indicator indicates the presence of the storage access exception and the condition code is set to a value indicating the interruptible instruction is not yet complete by the application program, calling an OS service that is part of the OS to resolve the storage access exception; and upon determining the OS service has resolved the storage access exception:

updating the data value in the protected OS memory space, and changing the condition code to indicate the interruptible instruction is complete.

9. The computing system of claim 8, wherein the OS service resolves the storage access exception without a program interrupt or a program abort being issued by hardware in a computing system executing the application program, the operations further comprising:

re-issuing the interruptible instruction to complete remaining function processing.

10. The computing system of claim 8, the operations further comprising:

generating results from performing respective processing steps of the plurality of processing steps of the interruptible instruction; and storing the results in application memory space in parallel with updating the data value in the protected OS memory space.

11. The computing system of claim 10, wherein the respective processing steps of the interruptible instruction comprises processing multiple blocks of data.

12. The computing system of claim 11, wherein the data value is a counter that is incremented by hardware, wherein updating the data value comprises storing an updated count into the counter to indicate a type of algorithm used to process the multiple blocks of data.

13. The computing system of claim 8, wherein calling the OS service that is part of the OS to resolve the storage access exception further comprises:

calling a macro in the OS using a macro call in the application program, wherein the macro calls the OS service.

14. The computing system of claim 13, wherein the OS service and the macro are in respective libraries in the OS.

15. A computer program product comprising:

one or more computer readable storage media; and program instructions stored on the one or more computer readable storage media to perform operations comprising:

performing, when executing an interruptible instruction issued by an application program, an operating system (OS) storage update, wherein the OS storage update needs to access a data value stored in protected OS memory space, and wherein executing the interruptible instruction comprises a plurality of processing steps of different blocks of data;

determining that a storage access exception is detected when hardware attempts to access the data value in the protected OS memory space;

updating an exception indicator to indicate a presence of the storage access exception;

setting a condition code for respective processing steps of the plurality of processing steps to indicate completion status of the different blocks of data;

upon determining the exception indicator indicates the presence of the storage access exception and the condition code is set to a value indicating the interruptible instruction is not yet complete by the application program, calling an OS service that is part of the OS to resolve the storage access exception; and upon determining the OS service has resolved the storage access exception:

updating the data value in the protected OS memory space, and changing the condition code to indicate the interruptible instruction is complete.

16. The computer program product of claim 15, wherein the OS service resolves the storage access exception without a program interrupt or a program abort being issued by hardware in a computing system executing the application program, the operations further comprising:

re-issuing the interruptible instruction to complete remaining function processing.

17. The computer program product of claim 15, wherein the operations further comprise:

generating results from performing respective processing steps of the plurality of processing steps of the interruptible instruction; and storing the results in application memory space in parallel with updating the data value in the protected OS memory space.

18. The computer program product of claim 17, wherein the respective processing steps of the interruptible instruction comprises processing multiple blocks of data, wherein the data value is a counter that is incremented by hardware, wherein updating the data value comprises storing an updated count into the counter to indicate a type of algorithm used to process the multiple blocks of data.

19. The computer program product of claim 16, wherein calling the OS service that is part of the OS to resolve the storage access exception further comprises:

calling a macro in the OS using a macro call in the application program, wherein the macro calls the OS service.

20. The computer program product of claim 19, wherein the OS service and the macro are in respective libraries in the OS.

* * * * *